(12) United States Patent
Burnett (10) Patent No.: US 6,839,424 B1
(45) Date of Patent: Jan. 4, 2005

(54) TELEPHONY SYSTEM

(75) Inventor: John Geoffrey Robert Wildman Burnett, Cambridge (GB)

(73) Assignee: Netcall PLC, Cambridge (GB)

( * ) Notice: Subject to any disclaimer, the term of this patent is extended or adjusted under 35 U.S.C. 154(b) by 335 days.

(21) Appl. No.: 09/679,410

(22) Filed: Oct. 3, 2000

(51) Int. Cl.[7] .............................................. H04M 5/00
(52) U.S. Cl. ..................................... 379/265.02; 705/14
(58) Field of Search ....................... 379/265.02, 265.11, 379/265.13, 266.07; 705/14

(56) References Cited

U.S. PATENT DOCUMENTS

| | | | | |
|---|---|---|---|---|
| 4,757,267 | A | * 7/1988 | Riskin | 379/114.24 |
| 5,283,731 | A | 2/1994 | Lalonde et al. | 705/1 |
| 6,233,325 | B1 | * 5/2001 | Frech et al. | 379/142.06 |
| 6,385,592 | B1 | * 5/2002 | Angles et al. | 705/14 |

FOREIGN PATENT DOCUMENTS

| | | |
|---|---|---|
| NL | 9401717 | 10/1994 |
| WO | WO 95/00911 | 1/1995 |

* cited by examiner

Primary Examiner—Ahmad F. Matar
Assistant Examiner—Quynh H. Nguyen
(74) Attorney, Agent, or Firm—Townsend and Townsend and Crew LLP (57) ABSTRACT

A telephony method and system deals with telephone calls related to advertisements, such as classified advertisements. When a caller responds to an advertisement, he inputs a reference to the advertisement. The advertiser or an agent is extracted from a database, and called. The advertiser is given the option of accepting the call, refusing the call or indicating that the advertiser wishes to receive no further calls. If the advertiser accepts the call, the advertiser is connected to the caller.

21 Claims, 6 Drawing Sheets

TELEPHONY SYSTEM

FIELD OF THE INVENTION

The invention relates to a telephony system, a method of using a telephony system and in particular to a telephony system and method for use in advertising.

BACKGROUND ART

Advertisements printed in a newspaper are a well-known means for advertising all kinds of products and services. Frequently, a telephone number is printed in the advertisement to allow potential customers to contact the advertiser. More recently, such advertisements have also started to appear on web pages on the internet.

Classified newspaper advertisements are a conventional means of advertising second hand cars, other goods, some services, job vacancies and the like. Again, a telephone number is normally provided by the advertiser to allow potential customers to contact the advertiser. However, a number of inconveniences are associated with the provision of a telephone number. Firstly, calls can continue to be made long after the advert has served its purpose, wasting the advertiser's time. For example, for a used car advertisement many people may waste the vendor's time even after the car has been sold. Furthermore, such telephone calls may be made at inconvenient times when the advertiser would prefer not to be disturbed, such as late at night.

NL94/01717 describes a system for connecting a customer to an advertiser anonymously. The caller calls into a telecommunications device including a switch, the device checks to see whether the call is to be transmitted to the advertiser, the device rings the advertiser, who can accept the call or hang up. If the advertiser does not hang up, the caller is anonymously connected to the advertiser. The system works as a stand-alone box, accessed by DTMF tones.

The advertiser may dial the device, on the same number used to respond to adverts, and then the DTMF tones produced by subsequent dialled digits can be detected and used to reset options. For example, the advertiser can dial 0 * followed by a PIN code to change options, for example to prevent further calls being routed to the advertiser.

The system can work with one telephone number per advertiser, or alternatively the switch can detect an expansion code between say 00 and 99 to select one of a hundred advertisers all on the same telephone number.

In this way, the system can anonymously route customers to advertisers without having to publish the advertiser's phone number.

Another classified advertisement system is described in U.S. Pat. No. 5,283,731 to Lalonde et al. In this system, a computer database stores details of a number of advertisements. A caller dials the system, keys in an identification number which may be printed in the classified pages of a newspaper, and receives further information about the advertisement.

However, the systems described in these patents application do not alleviate all inconveniences.

SUMMARY OF THE INVENTION

According to a first aspect of the invention there is provided a method of handling calls related to advertisements, comprising accepting an incoming call from a caller regarding an advertisement;

calling the contact corresponding to the advertisement;

receiving acceptance input from the contact to indicate whether the contact is to receive no more calls on the advertisement, is to receive further calls but not the present call, or is to take the call; and if the received acceptance input indicates that the contact is to take the call, connecting the caller to the contact.

In embodiments, the advertisements may be identified by references, and details of the advertisements stored in a database. The method may further comprise the steps of receiving input from the caller in the form of a reference to the advertisement;

extracting from a database details of the advertisement corresponding to the reference; and testing the extracted details to determine whether the contact is to take calls, and if not informing the caller, but otherwise calling the contact.

If the received acceptance input indicates that the advertiser is to receive no further calls on the advertisement, the database may be updated to indicate this fact.

The number dialled by the caller may be identified, for example using a dialled number identification system to determine the dialled number.

The contact may be the advertiser himself, an agent of the advertiser, an agency, a central bureau handling calls for a number of advertisers, or automatic voice response systems, a computer system or any suitable system, individual or group capable of dealing with incoming calls on behalf of the advertiser.

The telephone number of the caller may be determined, stored, and the caller then disconnected after the caller's details have been taken. The contact may then be called, and if the received acceptance input indicates that the contact wishes to take the call the caller can be dialled to connect the caller to the contact.

Caller line identity may be used to determine the caller's telephone number; alternatively the caller may be invited to key in a telephone number where he can be reached.

The telephone system may accept the incoming telephone call and send a message to a separate call-back system to carry out the steps of calling the contact, receiving acceptance input, and updating the database and/or connecting the caller to the advertiser. The message sent by the telephone system to the call-back system may include the reference number and the caller's telephone number.

In another aspect there is provided a method of connecting callers to contacts for replying to advertisements identified by corresponding references, comprising accepting an incoming message from a caller;

determining the telephone number of the caller;

receiving input from the caller in the form of a reference to an advertisement;

extracting from a database details of the advertisement corresponding to the reference;

testing the extracted details to determine whether the contact wishes to take calls, and if not informing the caller, but otherwise calling the contact;

receiving acceptance input from the contact to indicate whether the contact is to receive no more calls on the advertisement, is to receive further calls but not the present call, or is to take the call;

if the received acceptance input indicates that the contact is to receive no further calls on the advertisement, updating the database to indicate this fact; and if the received acceptance input indicates that the contact is to take the call, connecting the customer to the contact.

The incoming message may be, for example, an email or a telephone call.

In a further aspect, the invention provides a computer program product for causing a telephone system to carry out the steps of accepting an incoming telephone call from a caller to a dialled number;

identifying the dialled number;

receiving input from the caller in the form of a reference to an advertisement;

extracting from a database details of the advertisement corresponding to the reference including details of a contact corresponding to the advertisement;

testing the extracted details to determine whether the contact is to take calls, and if not informing the caller, but otherwise calling the contact;

receiving acceptance input from the contact to indicate whether the contact is to receive no more calls on the advertisement, is to receive further calls but not the present call, or is to take the call;

if the received acceptance input indicates that the contact is to receive no further calls on the advertisement, updating the database to indicate this fact; and if the received acceptance input indicates that the contact is to take the call, connecting the caller to the contact.

In a yet further aspect of the invention there may be provided a telephony system for connecting callers to contacts for reply to corresponding advertisements comprising a telephone connection for accepting an incoming telephone call from a caller to a dialled number;

a dialled number identification system for identifying the dialled number;

an out-dialler for dialling telephone numbers;

a database of advertisements, storing for each advertisement at least a corresponding reference and a corresponding contact telephone number;

and code for causing the telephone system to receive input from the caller in the form of a reference to an advertisement;

extract the details of the advertisement corresponding to the reference in the database;

test the extracted details to determine whether the advertiser is to take calls, and if not informing the caller, but otherwise dialling the contact telephone number on the out-dialler;

receiving acceptance input from the contact to indicate whether the contact is to receive no more calls on the advertisement, is to receive further calls but not the present call, or is to take the call;

if the received acceptance input indicates that the contact is to receive no further calls on the advertisement, updating the database to indicate this fact; and if the received acceptance input indicates that the contact is to take the call, connecting the caller to the advertiser.

The telephone system may further comprise a caller line identity system for determining the telephone number of the caller, and/or a network connection for allowing the database to be updated.

The telephone connection, the dialled number identification system, and the out-dialler may be arranged together in a call-handler. A separate call-back handler may be provided for dialling the contact telephone number on the out-dialler; for receiving acceptance input from the advertiser to indicate whether the contact is to receive no more calls on the advertisement, is to receive further calls but not the present call, or is to take the call; for updating the database if the received acceptance input indicates that the contact is to receive no further calls on the advertisement; and for connecting the caller to the contact if the received acceptance input indicates that the contact is to take the call.

The call-handler may be connected to the call-back handler by a computer network.

BRIEF DESCRIPTION OF THE DRAWINGS

For a better understanding of the invention, specific embodiments will now be described, purely by way of example, with reference to the accompanying drawings in which.

DETAILED DESCRIPTION

Figure 1:
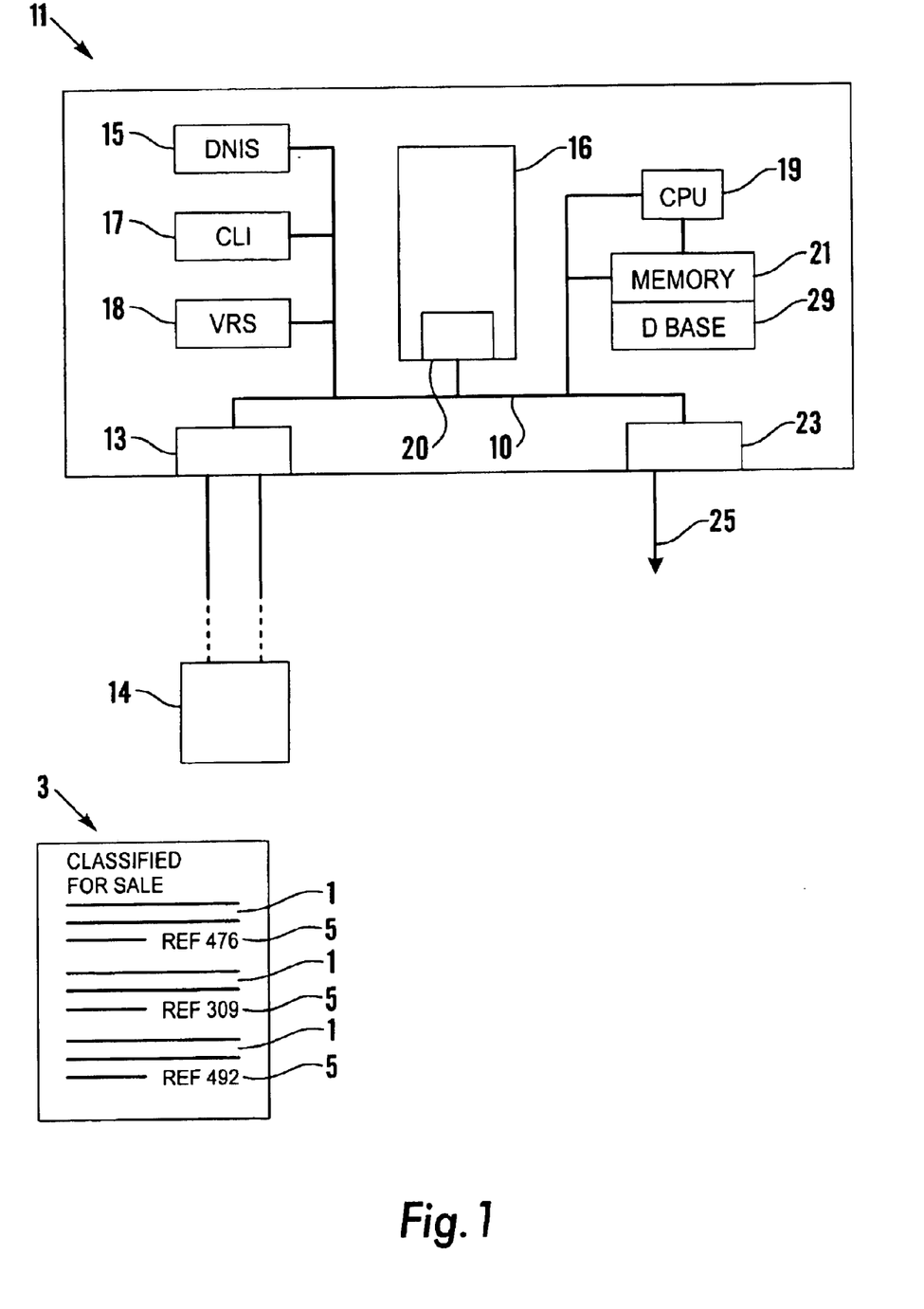
FIG. 1 shows a telephone system according to a first embodiment of the invention.

Referring to FIG. 1, a telephone system 11 according to an embodiment of the invention has a telephone standard connection 13 for connection to a central office switch 14 (a Centrex connection). This connection is one level higher than the level used by domestic subscribers to connect to a telephone exchange, and accordingly the telephone standard connection is a public service telephone network (PSTN) signal.

The telephone system 11 also contains a dialled number identity system (DNIS) 15 together with a caller line identity (CLI) system 17. The former identifies the number dialled by the caller and the latter identifies the telephone number of the caller. The use of the DNIS 15 accordingly allows one physical telephone system 11 to handle calls to a plurality of telephone numbers whilst retaining the information about which of the plurality of telephone numbers was called.

The telephone system 11 contains a conventional telephone card 16 with the capability for receiving calls and out-dialling, together with a central processing unit 19 and memory 21 which together with software stored in the memory controls the telephone system to carry out the invention.

The various components are connected together by a data bus 10, as is known.

The memory 21 also contains a database 29 storing details of the various advertisements, the advertisers, and other relevant information. The database stores reference numbers for the advertisements, contact telephone numbers for the corresponding advertisers and any other required information. Such databases are conventional and will not be described further.

A network connection 23 is connected to a network 25 such as a LAN, an intranet or the internet, to allow data transfer to and from the telephone apparatus.

A voice response system (VRS) 18 is also provided in the telephone system for supplying voice prompts and recording speech.

Separately from the telephone system, a plurality of classified advertisements 1 are printed in a newspaper 3, displayed on the internet or otherwise, together with corresponding reference numbers 5.

Figure 2:
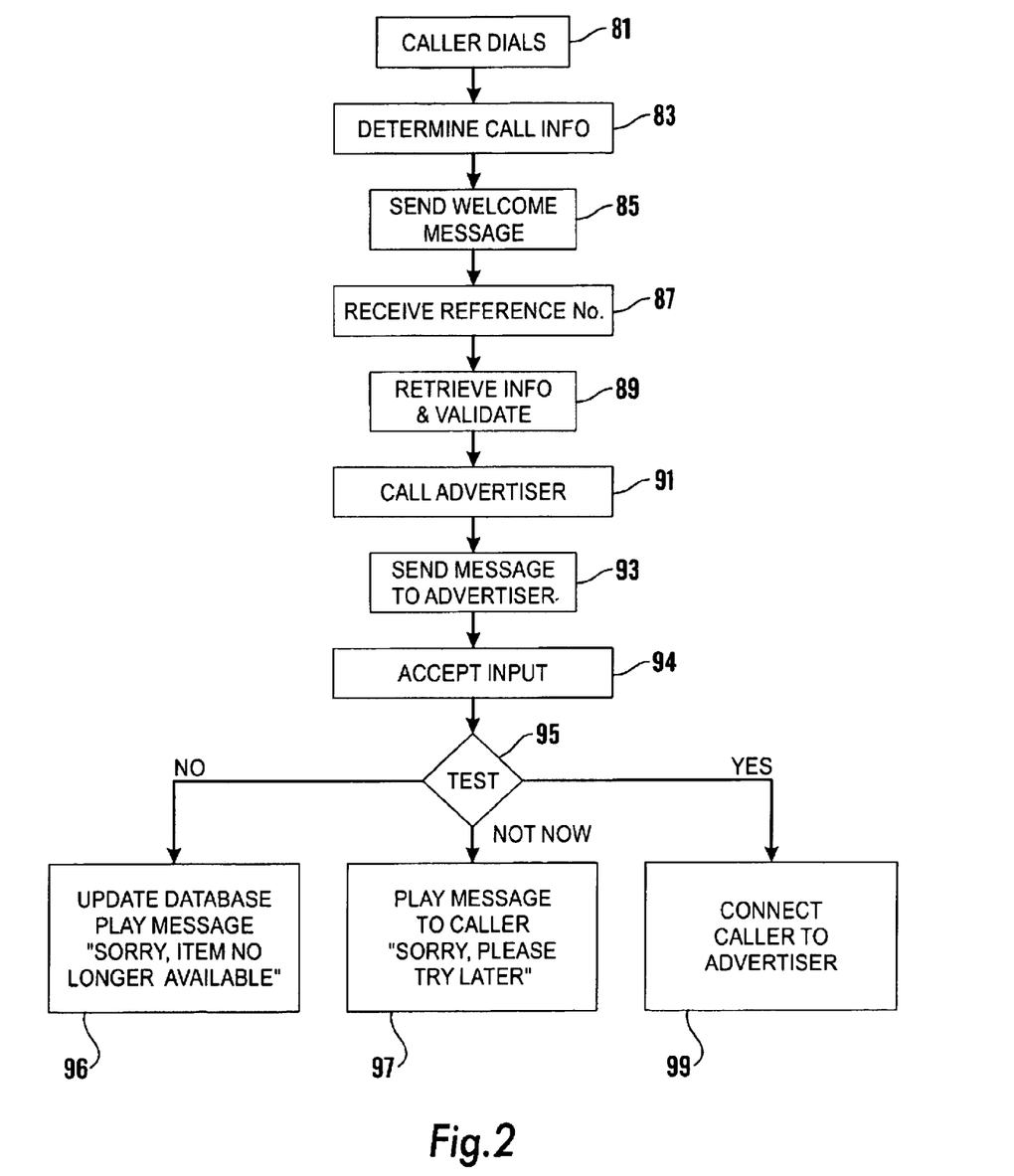
FIG. 2 illustrates the use of the telephone system according to the FIG. 1 in a "call-through" method.

Referring to FIG. 2, the use of the telephone system 11 of FIG. 1 will now be described in a "call-through" embodiment—the reason for this term will become apparent later.

The caller dials (step 81) a telephone number printed together with the advertisements, and is connected to the telephone system. The caller's identity is recorded by the CLI system, and the dialled number is determined using DNIS (Step 83). This information can be used for billing or record purposes.

The caller receives a welcome message (step 85), and is invited to key in the reference number of the advertisement he is interested in. The number keyed in is received by the system (step 87). The advertiser details retrieved from the database (29) and the reference number is validated by the system (step 89).

The advertiser is then called (step 91), a message is played (step 93) to the advertiser to invite him to select one of a number of options by keying a number on his telephone key pad. The input from the advertiser is accepted (step 94) and tested (step 95).

If the advertiser wishes to receive no further calls, for example in the case of a classified advertisement for a used car which has already been sold, the advertiser keys 5. The database 29 is then updated to indicate that no calls are to be put through to the advertiser of that advertisement, and a suitable message is played to the caller (step 96).

Alternatively, the advertiser may not be willing to take the call immediately, but would like to take the call later. In this case, a different message is played to the caller (step 97).

Alternatively, the advertiser may choose to accept the call in which case the inbound call from the caller is connected in the call-back handler to the outgoing call to the contact (step 99) to connect the two parties together. The caller and contact may then transact their business. The term "call-through" is used to describe this approach in which an incoming call is connected to the advertiser through the telephone system 11.

Figure 3:
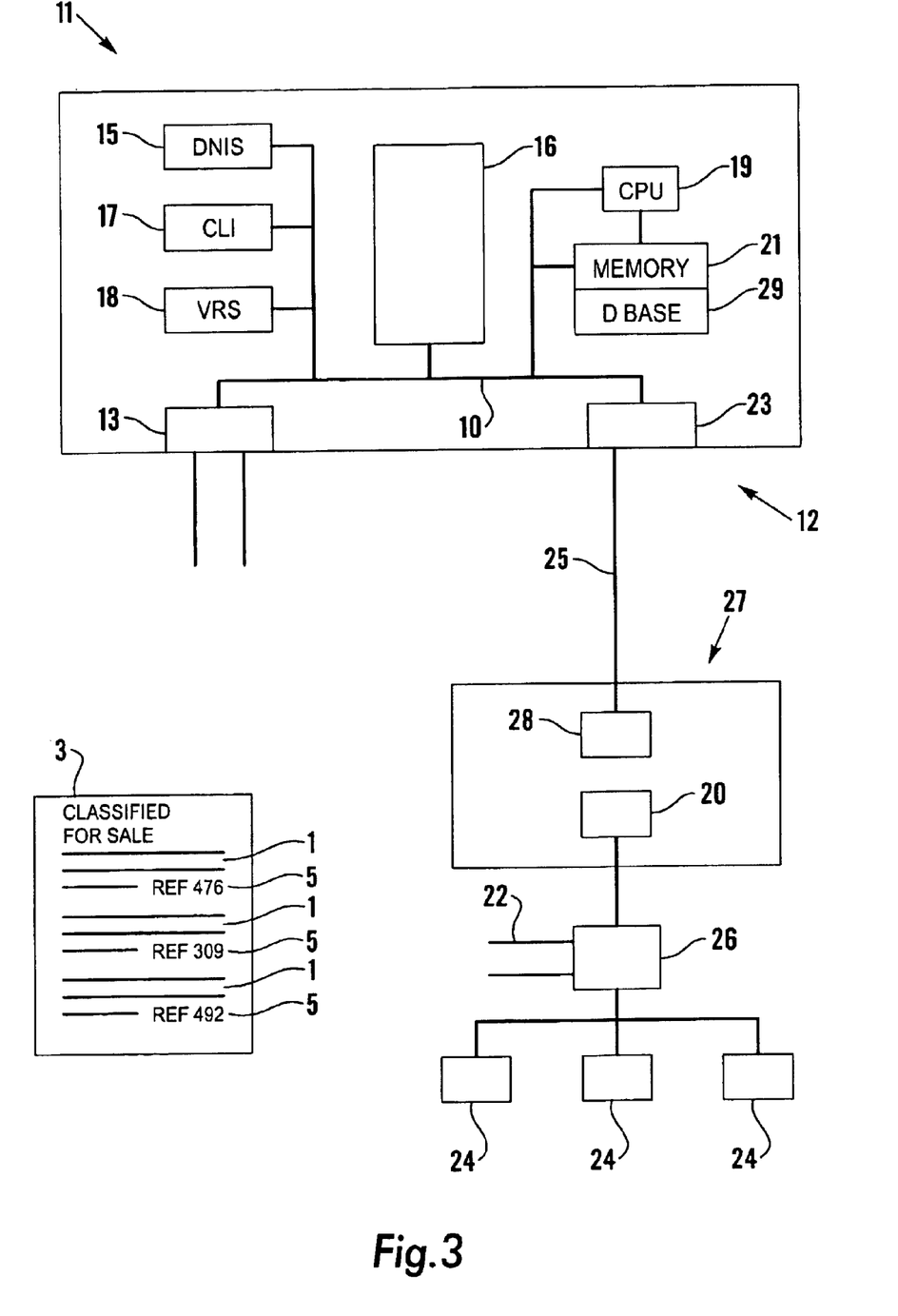
FIG. 3 shows a telephone system according to a second embodiment of the invention.

Referring to FIG. 3, in an alternative embodiment a separate call-back handler 27 is provided to implement the call back; the components previously discussed constitute a call handler 12.

The call-back handler has an out-dialler 20 connected via an ACD 26 to one or more agents 24 and to external telephone lines 22. The call-back handler includes a computer 28 connected to the network 25 for receiving messages from the call-handler 12.

Figure 4:
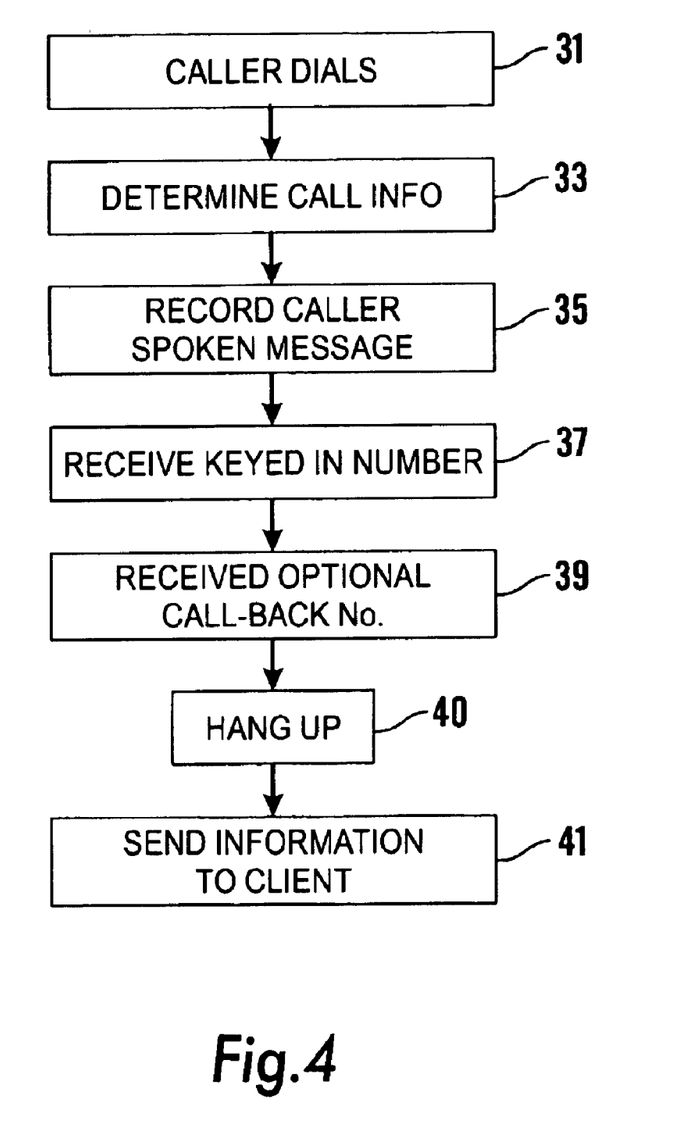
FIG. 4 illustrates the use of the telephone system according to FIG. 3 for data capture in a call-back method according to the invention.

In use (FIG. 4) a caller telephones (step 31) the call handler 12 of the telephone system 11 having noted the reference number of a particular advert. The DNIS 15 records the telephone number that the caller dialled, and the CLI system 17 records the caller's own telephone number (step 33). The caller is given the opportunity to record a wav file containing his speech (step 35) and to key in the reference number (step 37). Optionally, the caller may provide a telephone number to call back on (if the CLI system cannot detect the caller's number or if the caller wishes to be called back on a different number), and/or an extension number (step 39). When the information is received, the connection between caller and If sufficient details are given the call handler 12 then sends (step 41) a short piece of information down the internet to the callback handler 27. The information is a packet in the format:

http://123.45.67.890/cgi-win/Please-call.exe/ PHONE?refno=1010&telno=0123456789&ccode= 44&extn=&dnis=1234567&wavid=654.

As will be appreciated, this sends a piece of information to the internet site 123.45.67.890 with the instruction to execute a program Please-call.exe and various parameters.

The parameters are the reference number 1010 inputted by the caller, the number to call the caller back on (here 0123 456 789), the country code (here 44, the UK), no extension number, the last seven digits of the dialled number (here 1234567) and an index number 654 identifying a "wav" file recording the caller's speech.

In general, this approach will be particularly suitable where a single advertiser, such as a recruitment agency, offers a number of different opportunities, such as job vacancies. The advertiser can install a call-back handler to automatically connect agents such as recruitment consultants to the calling parties. The call-back handler 27 contains a windows computer 28 connected to the internet which has a program "Please-call" that actions the call-back request based on the information sent by the telephone card.

Figure 5:
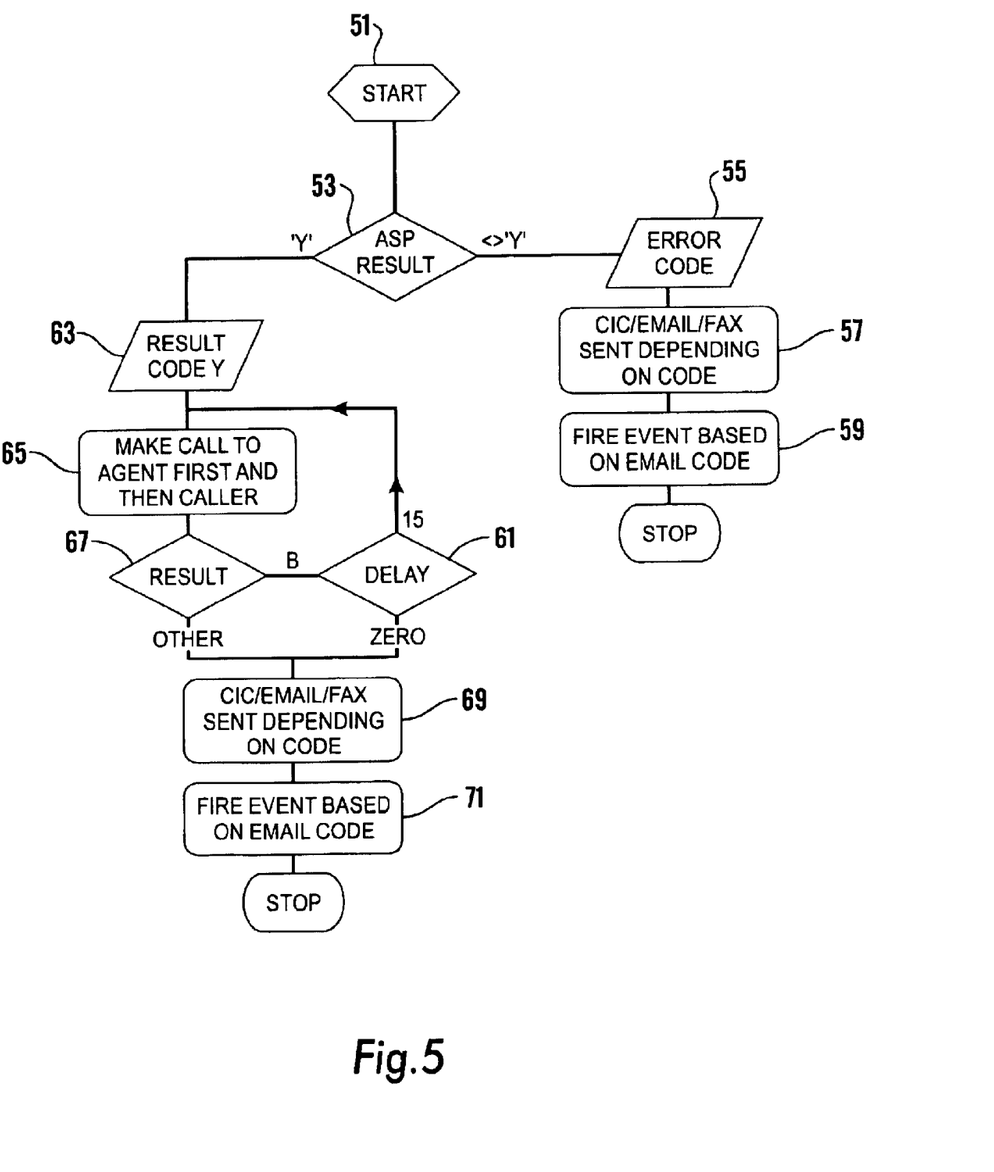
FIG. 5 illustrates call-back.

FIG. 5 is a flow diagram of the actions taken by the call-back handler 27.

The call is initiated 51 by sending a packet of information to the ACD 26 or call-back handler 27. The information is validated (step 53) and if the validation fails an error code is generated (step 55). The error codes may include invalid telephone number, invalid date, etc. Depending on the code, an email, fax or customer information call (CIC) may be generated (step 57) following which an event is fired (step 59) based on the code. For example, if it is determined that the number of calls on an advertisement exceeds the maximum permitted or the maximum number paid for, an email may be sent to the advertiser informing the advertiser of this fact.

If the validation step is passed, (result code Y—step 63), then a call is made to an agent 24 first and then the caller (step 65). The result is tested for (Step 67). If the system is busy ("B" result) then if a delay is programmed (step 61) then step 65 is repeated after a delay.

As in the call-through embodiment above, the agent 24 is given the option to accept or reject the call, or even to accept no further calls on that particular advertisement.

If the agent 24 accepts the call then the caller is called back by the ACD 26 on the external telephone network 22 and connected to the agent 24 to transact their business.

A customer information call (CIC), email or fax is sent depending on the output code (step 69); and an event is fired depending on the code (step 71).

Figure 6:
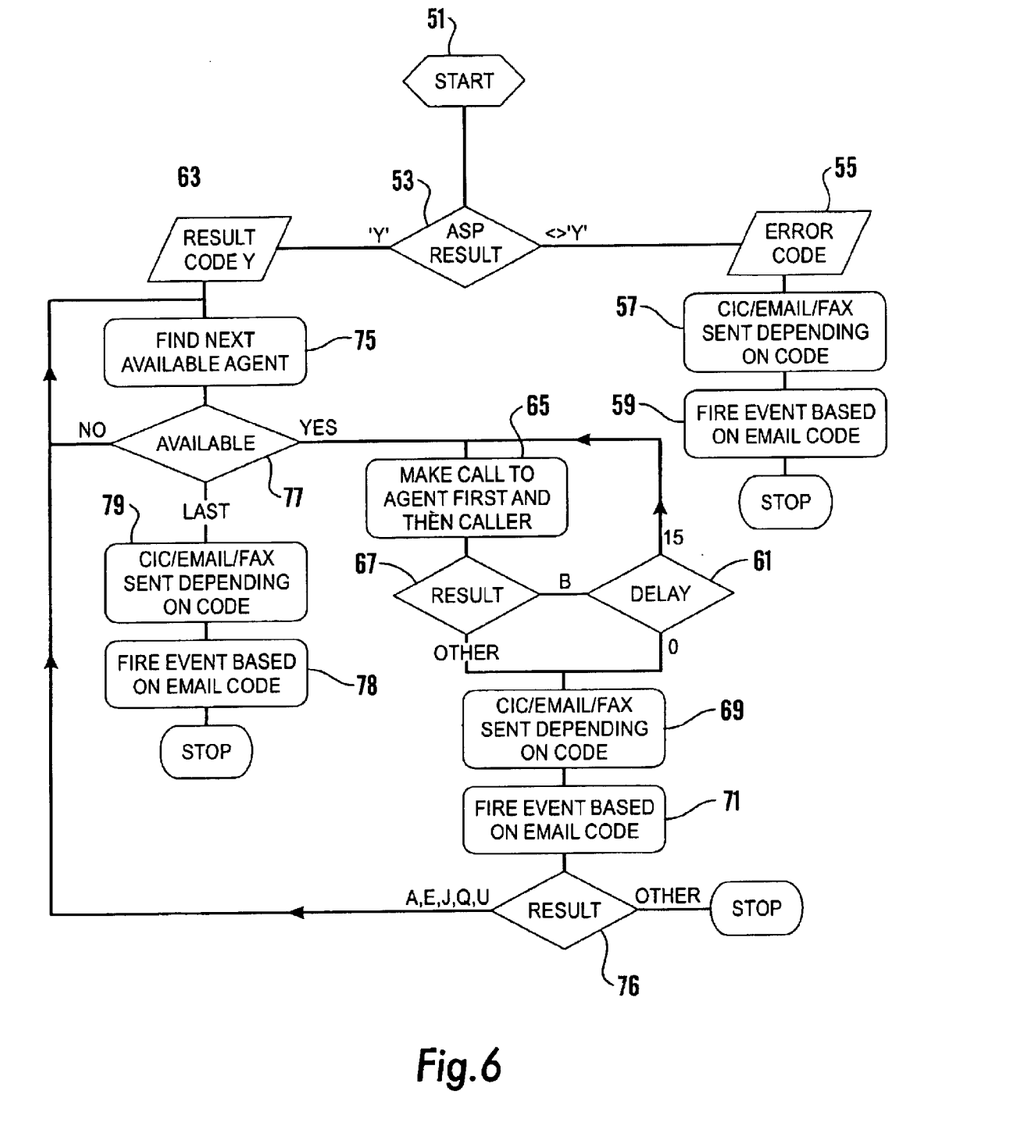
FIG. 6 illustrates an alternative call-back embodiment of the invention.

The call-back approach of FIG. 6 differs slightly in that more than one agent 24 may be in a position to call the caller back. Accordingly, some additional steps are provided over and above those described with reference to FIG. 5.

After step 63, the next available agent 24 is found (step 75), and the availability of that agent 24 is tested for (step 77). If the agent 24 is not found to be available, step 75 is repeated until an available agent 24 is found or until the last agent is found to be unavailable. In this case, a CIC or email or fax is sent (step 79) depending on the code, and an event is fired (step 78).

If an agent 24 is found to be available, then processing reverts to step 65 as in the method described with reference to FIG. 5.

Since in this scenario more than one agent may be able to provide assistance, the system then tests (step 76) whether another agent may be able to help. If so, control passes back to step 75.

The remaining steps take place as described with reference to FIG. 5.

It will be appreciated that although the term "agent" is used, the approach of FIG. 6 is particularly suited to a scenario in which a variety of agencies may be able to assist a caller. This may be the case, for example, where a number of recruitment consultants may all be able to offer similar positions.

In embodiments, the initial information to call a customer back can be provided through the internet rather than by telephone. In this approach, the customer clicks on a response button on an internet site next to an advertisement, and keys in suitable information such as his telephone number, extension, email address, web address, when to make the call-back, and any other information required. The internet site then sends this information together with information such as the job reference number, information identifying the web-site, advertiser and the like.

A number of general points may be made about the above embodiments. Firstly, the provision of a DNIS allows a single system to be used for a number of different telephone numbers; these may correspond to different advertisers, different newspapers or the like. Thus, the invention does not require each newspaper to purchase a system; rather, a single central system can deal with a number of newspapers. The DNIS also allows billing at different rates depending on the telephone number.

Secondly, the network connection allows easy access to the system to update the records. Customers, or newspaper proprietors, may use the internet to insert new advertisements, remove outdated advertisements and make other changes as required.

Thirdly, record keeping allows flexibility in billing. A newspaper proprietor may allow advertising on a pay-per lead basis, so that a customer only pays for calls connected.

The invention is not limited to the specific embodiments described above and variants can be made.

Although some of the embodiments have been described in terms of classified advertisements, or recruitment, it will be apparent that the telephone system can be used for any of a number of different advertising systems.

Although the term "advertiser" is used it should be apparent to the skilled person that this can include any contact such as the agents of the advertiser, employees of the advertiser or other parties able to deal with calls on behalf of the advertiser.

I claim:

1. A method of handling calls relating to classified advertisements, comprising the steps of
   accepting an incoming call from a caller regarding a classified advertisement;
   calling a contact corresponding to the classified advertisement;
   presenting the contact with an option to receive no more calls regarding the classified advertisement;
   receiving an acceptance input from the contact indicating whether the contact is to receive no more calls on the classified advertisement, is to receive further calls but not the incoming call, or is to take the incoming call; and
   acting on the incoming call in dependence upon the received acceptance input, including only connecting the caller to the contact when the received acceptance input indicates that the contact is to take the incoming call, and preventing future calls to the contact regarding the classified advertisement when the received acceptance input indicates that the contact is to take no more calls regarding the classified advertisement.

2. A method according to claim 1 wherein the classified advertisements are identified by references, and details of the classified advertisements are stored in a database, the method further comprising the steps of
   receiving input from the caller in the form of a reference to the classified advertisement;
   extracting from a database details of the classified advertisement corresponding to the reference, including details of the corresponding contact; and
   testing the extracted details to determine whether the contact is to take calls, and if not informing the caller, but otherwise connecting the caller to the contact.

3. A method according to claim 2 wherein the method further includes the step of updating the database, if the
   received acceptance input indicates that the contact is to receive no further calls on the classified advertisement, to indicate that the contact is to receive no further calls on the classified advertisement.

4. A method according to claim 1 further comprising the step of identifying the number dialled by the caller.

5. A method according to claim 1 wherein the method further comprises the steps of
   determining the telephone number of the caller; storing the telephone number of the caller; disconnecting the caller; and
   dialling the caller to connect the caller to the contact if the received acceptance input indicates that the contact wishes to take the call.

6. A method according to claim 5 wherein caller line identity is used to determine the caller's telephone number.

7. A method according to claim 5 wherein a telephone system accepts the incoming telephone call and sends a message to a call-back system which carries out the steps of calling the contact, receiving acceptance input, and updating the database and/or connecting the caller to the contact.

8. A method according to claim 7 wherein the message sent by the telephone system to the call-back system includes the reference number and the caller's telephone number.

9. A method according to claim 1 wherein a dialed number identification system is used to determine the dialled number.

10. A method according to claim 1 wherein if the contact is to receive no further calls a message is sent to the caller to inform him.

11. A method according to claim 1 wherein if the contact is not to receive the present call a message is sent to the caller to inform him.

12. A method of connecting callers to reply contacts for advertisements, comprising
    accepting an incoming call from a caller;
    determining the telephone number of the caller;
    receiving input from the caller in the form of a reference to a classified advertisement;
    extracting from a database details of a contact for the classified advertisement corresponding to the reference;
    testing the extracted details to determine whether the contact wishes to take calls, and if not informing the caller, but otherwise
    calling the contact;
    presenting the contact with an option to receive no more calls regarding the classified advertisement;
    receiving acceptance input from the contact to indicate whether the contact is to receive no more calls on the advertisement, is to receive further calls but not the incoming call, or is to take the incoming call; and
    acting on the incoming call in dependence upon the received acceptance input, including connecting the caller to the contact if the received acceptance input indicates that the contact is to take the call, and preventing future calls to the contact regarding the classified advertisement when the received acceptance input indicates that the contact is to take no more calls regarding the classified advertisement.

13. A method according to claim 12 wherein the incoming message is an email.

14. A computer program product for causing a telephone system to carry out the steps of accepting an incoming telephone call from a caller to a dialled number;

identifying the dialled number;

receiving input from the caller in the form of a reference to a classified advertisement;

extracting from a database details of the advertisement corresponding to the reference including details of a contact corresponding to the classified advertisement;

testing the extracted details to determine whether the contact is to take calls, and if not informing the caller, but otherwise calling the contact;

presenting the contact with an option to receive no more calls regarding the classified advertisement;

receiving an acceptance input from the contact to indicate whether the contact is to receive no more calls on the advertisement, is to receive further calls but not the incoming telephone call, or is to take the incoming telephone call; and acting on the incoming telephone call in dependence upon the received acceptance input, including preventing future calls to the contact regarding the classified advertisement when the received acceptance input indicates that the contact is to take no more calls regarding the classified advertisement.

15. A telephony system for connecting callers to contacts for reply to corresponding advertisements, the telephony system comprising a telephone connection for accepting an incoming telephone call from a caller to a dialled number;

a dialled number identification system for identifying the dialled number;

an out-dialler for dialling telephone numbers;

a database of classified advertisements, storing for each classified advertisement at least a corresponding reference and a corresponding contact telephone number for an advertiser;

and code for causing the telephone system to:

receive input from the caller in the form of a reference to a classified advertisement;

extract the details of the advertisement corresponding to the reference in the database;

test the extracted details to determine whether the advertiser is to take calls, and if not informing the caller, but otherwise dialling the contact telephone number on the outdialler;

presenting the advertiser with an option to receive no more calls regarding the classified advertisement;

receiving acceptance input from the advertiser to indicate whether the contact is to receive no more calls on the classified advertisement, is to receive further calls but not the present incoming telephone call, or is to take the incoming telephone call; and acting on the incoming telephone call in dependence upon the received acceptance input, including connecting the caller to the contact if the received acceptance input indicates that the contact is to take the incoming telephone call, and preventing future calls to the contact regarding the classified advertisement when the received acceptance input indicates that the contact is to take no more calls regarding the classified advertisement.

16. A telephony system according to claim 15 further comprising a caller line identity system for determining the telephone number of the caller.

17. A telephony system according to claim 15 further comprising a network connection for allowing the database to be updated.

18. A telephony system according to claim 15 wherein the telephone connection and the dialled number identification system are arranged together in a callhandling component; and the out-dialler is arranged in a call-back handler, for dialling the contact telephone number on the outdialler, receiving an acceptance input from the advertiser to indicate whether the contact is to receive no more calls on the advertisement, is to receive further calls but not the present call, or is to take the call, if the received acceptance input indicates that the contact is to receive no further calls on the advertisement, updating the database to indicate this fact, and if the received acceptance input indicates that the contact is to take the call, connecting the caller to the contact.

19. A telephone system according to claim 18 wherein the call-handling component is connected to the call-back handler by a computer network.

20. A telephone system according to claim 18 wherein connecting the caller to the contact comprises:

determining the telephone number of the caller; storing the telephone number of the caller; disconnecting the caller; and dialling the caller to connect the caller to the contact if the received acceptance input indicates that the contact wishes to take the call.

21. A method of handling calls relating to advertisements, comprising the steps of accepting an incoming call from a caller regarding a classified advertisement;

determining the telephone number of the caller;

storing the telephone number of the caller;

disconnecting the caller;

calling a contact corresponding to the classified advertisement;

presenting the contact with an option to receive no more calls regarding the classified advertisement;

receiving an acceptance input from the contact indicating whether the contact is to receive no more calls on the classified advertisement, is to receive further calls but not the present call, or is to take the call;

dialling the caller to connect the caller to the contact if the received acceptance input indicates that the contact wishes to take the call; and preventing future calls to the contact regarding the classified advertisement when the received acceptance input indicates that the contact is to take no more calls regarding the classified advertisement.

* * * * *